United States Patent Office — 3,203,942 — Patented Aug. 31, 1965

3,203,942
METHOD FOR PURIFYING OLEFIN POLYMERS
Cornelio Caldo, Terni, Italy, assignor to Montecatini Società Generale per l'Industria Mineraria e Chimica, Milan, Italy
No Drawing. Filed Apr. 3, 1961, Ser. No. 99,985
Claims priority, application Italy Apr. 8, 1960, 6,207/60
4 Claims. (Cl. 260—93.7)

The present invention relates to a method for purifying the polymers obtained by the stereospecific polymerization of olefins, more particularly polymers of propylene.

Processes are known for polymerizing alpha-olefins with catalysts comprising at least an organometallic compound of a metal belonging to the 1st, 2nd or 3rd group of the Mendeleeff Periodic Table and a solid crystalline halide of a transition metal belonging to the 4th, 5th or 6th group of the same Periodic Table. These known processes are carried out in the presence or absence of activators such as pyridine, phosphines, arsines, bismuthines and/or ethers.

Said processes substantially comprise the introduction of the monomer, the solvent, which dissolves the olefin and acts as a suspending medium for the polymer formed, and the catalyst system, preferably consisting of an alkyl aluminium and titanium trichloride, into the polymerization reactor.

The polymerization is carried out for a given period of time (10–100 hours) at a temperature of 30–90° C. under pressure of 1 to 15 atm.

It is known that in order to purify the polymer, the slurries obtained at the end of the polymerization, have been subjected to various treatments.

Such treatments consisted of contacting the slurries with compounds such as alcohols, organic acids, mineral acids, or alkalies.

Compounds having the capacity of forming complexes have also been proposed as "clarification agents" for the polymer slurries.

It has now been surprisingly found that, compounds having the following general formula:

$$CHO—(X)_n—CHO \qquad (A)$$

wherein X is a methylene group and $n$ is a value between zero and 10, can advantageously be used as clarification agents.

An object of the present invention is therefore to provide a method for purifying polymers of olefins, especially polymers of ethylene, propylene, butene-1, pentene, hexene, methyl pentene and particularly crystalline isotactic polymers of propylene; these polymers being obtained by the polymerization of the olefins using the aforementioned catalysts which promote stereospecific polymerization.

This object is achieved by treating the polymerization slurries, after the termination of the polymerizations, with a compound of the general formula:

$$CHO—(X)_n—CHO \qquad (A)$$

wherein X is a methylene group and $n$ is between zero and 10.

These compounds can be added to the slurries at the end of the polymerization, either alone or dissolved or dispersed in inert solvents. Hydrocarbon solvents such as benzene, toluene, cyclohexene, n-heptane and other saturated hydrocarbons are preferably used.

After clarification of the polymerization slurries with the compounds of the above general Formula A, the polymer is preferably subjected to a treatment with water or steam, in order to remove both the hydrocarbon solvent and the clarification agent. This treatment either dissolves the compounds of general Formula A or removes them by mechanical entrainment.

Compounds of general Formula A such as, glyoxal and succinic dialdehyde are particularly suitable for use in this clarification of the polymerization slurries.

The polymers purified according to the method of the present invention possess a very low ash content (lower than 0.1%) and these highly pure polymers are therefore particularly suitable for use in the production of fibers and films.

The amount of the formula A compound added to the polymerization slurries, according to the present invention, can vary within wide limits. These compounds are preferably added in amounts between 10% and 1000% based on the total weight of the catalyst.

The following examples are given to illustrate the present invention without limiting its scope.

*Example 1*

80 litres of n-heptane, 179 g. of $Al(C_2H_5)_3$ in a 10% heptane solution and 121 g. of $TiCl_3$ are introduced into a 200-l. stainless steel autoclave.

After heating this mixture up to a temperature of about 75° C., a propylene feed is started and continued until 125 l. of liquid monomer are absorbed. The polymerization proceeds for 12 hours at 75° C. The unreacted monomer is removed and recovered. This polymerization slurry is then used in Example 2.

*Example 2*

A polymerization slurry obtained according to the process described in the preceding example, is transferred into a 400-l. enamelled reactor where it is contacted with 1.5 kg. of succinic dialdehyde in 25 l. of heptane, according to the present invention.

The slurry is agitated at 90° C. for 3 hours and is then centrifuged in order to remove the solvent. The cake thus obtained is treated with steam. The polymer obtained, after centrifugation and drying, possesses an ash content of 0.058%.

Many variations can of course be made without departing from the spirit of the present invention.

Having thus described the present invention, what it is desired to secure and claimed by Letters Patent is:

1. A method of purifying polymers of mono-olefins having from 2 to 6 carbon atoms per molecule which comprises treating a slurry of the polymerized olefin with succinic dialdehyde as a purifying agent and subsequently washing the treated polymer with water; said purifying agent being added to the slurry of polymer in an amount ranging from about 10% to 1000% by weight of the catalyst used in the polymerization reaction; said catalyst consisting of triethyl aluminum and titanium trichloride.

2. A method of purifying polymers of mono-olefins having from 2 to 6 carbon atoms per molecule which comprises treating a slurry of the polymerized olefin with succinic dialdehyde as a purifying agent and subsequently washing the treated polymer with steam; said purifying agent being added to the slurry of polymer in an amount ranging from about 10% to 1000% by weight of the catalyst used in the polymerization reaction; said catalyst consisting of triethyl aluminum and titanium trichloride 3. The method of claim 1 further characterized in that the purifying agent is employed in combination with an inert solvent.

4. The method of claim 1 further characterized in that the olefin is propylene.

(References on following page)

References Cited by the Examiner

UNITED STATES PATENTS

| | | | |
|---|---|---|---|
| 2,881,156 | 4/59 | Pilar et al. | 260—94.9 |
| 2,918,461 | 12/59 | Flynn | 260—94.9 |
| 2,930,783 | 3/60 | Weber et al. | 260—94.9 |
| 2,955,107 | 10/60 | Lovett et al. | 260—93.7 |
| 3,014,016 | 12/61 | Natta et al. | 260—94.9 |

JOSEPH L. SCHOFER, *Primary Examiner.*

LESLIE H. GASTON, WILLIAM H. SHORT,
*Examiners.*